(12) United States Patent
Phillips

(10) Patent No.: US 8,051,811 B2
(45) Date of Patent: Nov. 8, 2011

(54) KNOCK RESISTANT SPLIT-CYCLE ENGINE

(75) Inventor: Ford A. Phillips, San Antonio, TX (US)

(73) Assignee: Scuderi Group, LLC, West Springfield, MA (US)

( * ) Notice: Subject to any disclaimer, the term of this patent is extended or adjusted under 35 U.S.C. 154(b) by 819 days.

(21) Appl. No.: 12/157,460

(22) Filed: Jun. 11, 2008

(65) Prior Publication Data
US 2009/0038597 A1    Feb. 12, 2009

Related U.S. Application Data

(60) Provisional application No. 60/963,742, filed on Aug. 7, 2007.

(51) Int. Cl.
*F02B 33/22* (2006.01)
*F02B 5/00* (2006.01)
*F02B 19/00* (2006.01)

(52) U.S. Cl. ........ 123/70 R; 123/305; 123/301; 123/261

(58) Field of Classification Search ................ 123/70 R, 123/305, 261
See application file for complete search history.

(56) References Cited

U.S. PATENT DOCUMENTS

| | | | |
|---|---|---|---|
| 1,305,577 A | 6/1919 | Wolfard | |
| 3,880,126 A * | 4/1975 | Thurston et al. | 123/70 R |
| 3,896,774 A | 7/1975 | Siewert | |
| 4,565,167 A | 1/1986 | Bryant | |
| 4,715,326 A * | 12/1987 | Thring | 123/3 |
| 4,781,155 A * | 11/1988 | Brucker | 123/70 V |
| 5,499,605 A * | 3/1996 | Thring | 123/70 R |
| 5,857,436 A * | 1/1999 | Chen | 123/70 R |
| 6,880,501 B2 | 4/2005 | Suh et al. | |
| 7,201,156 B1 * | 4/2007 | Wait | 123/556 |
| 7,219,630 B2 * | 5/2007 | Patton | 123/25 C |
| 7,389,755 B2 * | 6/2008 | Noland | 123/68 |

* cited by examiner

*Primary Examiner* — Noah Kamen
*Assistant Examiner* — Grant Moubry
(74) *Attorney, Agent, or Firm* — Fildes & Outland, P.C.

(57) ABSTRACT

An engine has a rotatable crankshaft. A compression piston is received within a compression cylinder and operatively connected to the crankshaft such that the compression piston reciprocates through an intake stroke and a compression stroke during a single rotation of the crankshaft. An expansion piston is received within an expansion cylinder and operatively connected to the crankshaft such that the expansion piston reciprocates through an expansion stroke and an exhaust stroke during a single rotation of the crankshaft. A crossover passage interconnects the compression and expansion cylinders. The crossover passage includes a crossover compression valve and a crossover expansion valve defining a pressure chamber therebetween. A fuel injector is disposed in the pressure chamber of the crossover passage. Fuel injection from the fuel injector into the crossover passage is timed to occur entirely during the compression stroke of the compression piston.

10 Claims, 12 Drawing Sheets

KNOCK RESISTANT SPLIT-CYCLE ENGINE

CROSS REFERENCE TO RELATED APPLICATIONS

This application claims the benefit of U.S. Provisional Patent Application No. 60/963,742 filed Aug. 7, 2007.

TECHNICAL FIELD

The present invention relates to internal combustion engines. More specifically, the present invention relates to a turbocharged split-cycle engine having a pair of pistons in which one piston is used for the intake and compression strokes and another piston is used for the expansion (or power) and exhaust strokes, with each of the four strokes being completed in one revolution of the crankshaft.

BACKGROUND OF THE INVENTION

For purposes of clarity, the term "conventional engine" as used in the present application refers to an internal combustion engine wherein all four strokes of the well known Otto cycle (i.e., the intake, compression, expansion and exhaust strokes) are contained in each piston/cylinder combination of the engine. The term split-cycle engine as used in the present application may not have yet received a fixed meaning commonly known to those skilled in the engine art. Accordingly, for purposes of clarity, the following definition is offered for the term "split-cycle engine" as may be applied to engines disclosed in the prior art and as referred to in the present application.

A split-cycle engine as referred to herein comprises:

a crankshaft rotatable about a crankshaft axis;

a compression piston slidably received within a compression cylinder and operatively connected to the crankshaft such that the compression piston reciprocates through an intake stroke and a compression stroke during a single rotation of the crankshaft;

an expansion (power) piston slidably received within an expansion cylinder and operatively connected to the crankshaft such that the expansion piston reciprocates through an expansion stroke and an exhaust stroke during a single rotation of the crankshaft; and a crossover passage interconnecting the expansion and compression cylinders, the crossover passage including a crossover compression (XovrC) valve and a crossover expansion (XovrE) valve defining a pressure chamber therebetween.

U.S. Pat. No. 6,543,225 granted Apr. 8, 2003 to Carmelo J. Scuderi contains an extensive discussion of split-cycle and similar type engines. In addition the patent discloses details of a prior version of an engine of which the present invention comprises a further development.

Referring to FIG. 1, an exemplary embodiment of the prior art split-cycle engine concept is shown generally by numeral 10. The split-cycle engine 10 replaces two adjacent cylinders of a conventional four-stroke engine with a combination of one compression cylinder 12 and one expansion cylinder 14. These two cylinders 12, 14 perform their respective functions once per crankshaft 16 revolution. The intake charge (fuel and air) is drawn into the compression cylinder 12 through typical poppet-style intake valves 18. The compression cylinder piston 20 pressurizes the charge and drives the charge through the crossover passage 22, which acts as the intake passage for the expansion cylinder 14.

A check type crossover compression (XovrC) valve 24 at the crossover passage inlet is used to prevent reverse flow from the crossover passage 22. A crossover expansion (XoveE) valve 26 at the outlet of the crossover passage 22 controls flow of the pressurized intake charge into the expansion cylinder 14. Spark plug 28 is fired soon after the intake charge enters the expansion cylinder 14 and the resulting combustion drives the expansion cylinder piston 30 down. Exhaust gases are pumped out of the expansion cylinder through poppet exhaust valves 32.

With the split-cycle engine concept, the geometric engine parameters (i.e., bore, stroke, connecting rod length, compression ratio, etc.) of the compression and expansion cylinders are generally independent from one another. For example, the crank throws 34, 36 for each cylinder may have different radii and be phased apart from one another with top dead center (TDC) of the expansion cylinder piston 30 occurring prior to TDC of the compression cylinder piston 20. This independence enables the split-cycle engine to potentially achieve higher efficiency levels and greater torques than typical four stroke engines.

In split-cycle engines, the intake stroke follows the compression stroke, whereas, in conventional engines, the intake stroke follows the exhaust stroke. Accordingly, in a split-cycle engine, a small amount of compressed high pressure air is always trapped in the compression cylinder when the compression piston reaches its top dead center position. Because this compressed air must be re-expanded during the intake stroke before a fresh charge of air can be drawn in, the compression cylinder of a split-cycle engine must be sized to include the volume of re-expanded trapped air in addition to the volume of a fresh charge of air. This tends to increase the size and reduce the power density of a split-cycle engine relative to a conventional engine with the same intake charge.

Both split-cycle engines and conventional engines may have their intake pressures boosted, e.g. through turbocharging, supercharging or the like, to increase the power density and decrease the overall size of the engine. The greater the boost (i.e., increase in pressure above one atmosphere pressure absolute) over a naturally aspirated engine, the greater the power density and the more an engine may be downsized.

Problematically, the amount of boost that can be provided to the intake charge of either a conventional or split-cycle gasoline engine is limited by the point at which the fuel/air mixture is forced into premature combustion (i.e., knocking) by excessive pressures and temperatures developed within the engine during the compression stroke. It is well known that in a conventional gasoline engine with a single stage turbocharger, the boost pressure is limited to approximately 1.5 to 1.7 bar absolute before knocking will occur. Higher boost pressures are potentially attainable, but require expensive multistage boosting and intercooling systems in prior art conventional engines.

Accordingly, there is a need to increase the resistance to knock for engines generally and for split-cycle engines in particular. More specifically, there is a need to increase the knock resistance of split-cycle engines such that they may have their intake charge boosted to pressures of 1.7 bar absolute or greater.

SUMMARY OF THE INVENTION

The present invention includes a split-cycle engine having various features which contribute to knock prevention, or higher knock resistance. Three of those features are:

1. Very late fuel injection into the crossover (Xovr) passages, compared to a conventional engine;

2. Rapid air-fuel mixing aided by highly turbulent sonic flow through the valves connecting the Xovr passage to the expansion cylinder (XovrE valves); and 3. A predetermined heat loss through crossover passage walls due to active or passive cooling of high temperature air in the Xovr passage, which lowers the charge air temperature within the Xovr passage itself.

An exemplary engine according to the invention includes:
a crankshaft rotatable about a crankshaft axis of the engine;
a compression piston slidably received within a compression cylinder and operatively connected to the crankshaft such that the compression piston reciprocates through an intake stroke and a compression stroke during a single rotation of the crankshaft;
an expansion piston slidably received within an expansion cylinder and operatively connected to the crankshaft such that the expansion piston reciprocates through an expansion stroke and an exhaust stroke during a single rotation of the crankshaft;
a crossover passage interconnecting the compression and expansion cylinders, the crossover passage including a crossover compression (XovrC) valve and a crossover expansion (XovrE) valve defining a pressure chamber therebetween; and
a fuel injector disposed in the pressure chamber of the crossover passage;
wherein fuel injection from the fuel injector into the crossover passage is timed to occur entirely during the compression stroke of the compression piston.

Additional embodiments of the invention may include:

Start of fuel injection (SOI) into the crossover passage occurs in the range from 25° to 0° crank angle (CA) before top dead center (BTDC) of the expansion cylinder and fuel injection ends (EOI) in the range from 10° CA BTDC to 10° after top dead center (ATDC) of the expansion piston.

The crossover passage is constructed to conduct away at least 5.3 percent of the heat energy contained in compressed gas retained in the crossover passage between closing of the crossover expansion valve during an expansion stroke of the expansion piston and opening of the crossover compression valve during a following compression stroke of the compression piston. An uninsulated passage can conduct away at least 13 percent of the heat energy. It can also be actively cooled to control the heat loss.

During operation at full load between 1400 RPM and 4000 RPM of the crankshaft, the pressure ratio across the closed crossover expansion valve equals or exceeds the sonic flow critical pressure ratio, causing initial sonic flow of compressed gas from the crossover passage to the expansion cylinder upon opening of the crossover expansion valve. At least a portion of the injected fuel may be passed through the crossover expansion valve during the initial sonic flow of gas into the expansion cylinder.

Optionally, at least two separate crossover passages may connect to each expansion cylinder, with each crossover passage having an associated crossover compression and expansion valve. The crossover passages are sized to conduct away a controlled amount of heat energy contained in compressed gas in the crossover passages between closing of the associated crossover expansion valves during an expansion stroke of the expansion piston and opening of the associated crossover compression valves during a following compression stroke of the compression piston.

These and other features and advantages of the invention will be more fully understood from the following detailed description of the invention taken together with the accompanying drawings.

DETAILED DESCRIPTION OF THE INVENTION

Glossary

The following glossary of acronyms and definitions of terms used herein is provided for reference:
Air/fuel Ratio: The proportion of air to fuel in the intake charge.
Bottom Dead Center (BDC): The piston's farthest position from the cylinder head, resulting in the largest cylinder volume of the cycle.
Crank Angle (CA): The angle of rotation of the crankshaft.
Critical Pressure Ratio: The ratio of pressures which cause the flow through an orifice to achieve sonic velocity, i.e. Mach 1. It can be calculated from the following equation:

$$\frac{p_0}{p_c} = \left(\frac{\gamma+1}{2}\right)^{\frac{\gamma}{\gamma-1}}$$

Where:
$p_c$=critical pressure (at throat)
$p_0$=upstream pressure
$\gamma$=specific heat ratio.
For dry air at room temperature $\gamma$=1.4, so the critical pressure ratio is 1.893.

Compression/Expansion Cylinder Displacement Ratio: The ratio of the displacement of the compression cylinder to the expansion cylinder.

Compression Ratio: The ratio of cylinder volume at BDC to that at TDC.

Cylinder Displacement: The volume that the piston displaces from BDC to TDC.

Full (100%) Engine Load: The maximum torque that an engine can produce at a given speed.

Knock: The tendency of a fuel/air mixture to self ignite during compression.

Knock Fraction: A predicted parameter which provides a relative indication of the tendency of a particular fuel/air mixture to reach self ignition during compression. Self ignition is usually denoted by a knock value fraction of 1 while no tendency to self ignite is usually denoted by a knock fraction of zero. For example, a knock fraction of 0.8 indicates that the chemical pre-reactions to self ignition have reached 80% of the value required to generate self-ignition.

Octane (ON): A relative empirical rating of a fuel's resistance to self-ignition during a compression stroke in an internal combustion engine. Octane number (ON) is measured on a scale of 0-120, with 100 octane being a fuel (iso-octane) with high resistance to self ignition, while n-heptane has a high tendency to knock during compression and is assigned a zero (0) octane number.

Power Density: The brake power/engine displacement, usually expressed as kilowatts/liter or horsepower/liter.

Stoichiometric Ratio The chemically correct mass ratio of air to fuel to ensure that all the fuel is burned (oxidized) and all the oxygen is utilized for that burn.

Top Dead Center (TDC): The closest position to the cylinder head that the piston reaches throughout the cycle, providing the lowest cylinder volume.

Figure 1:
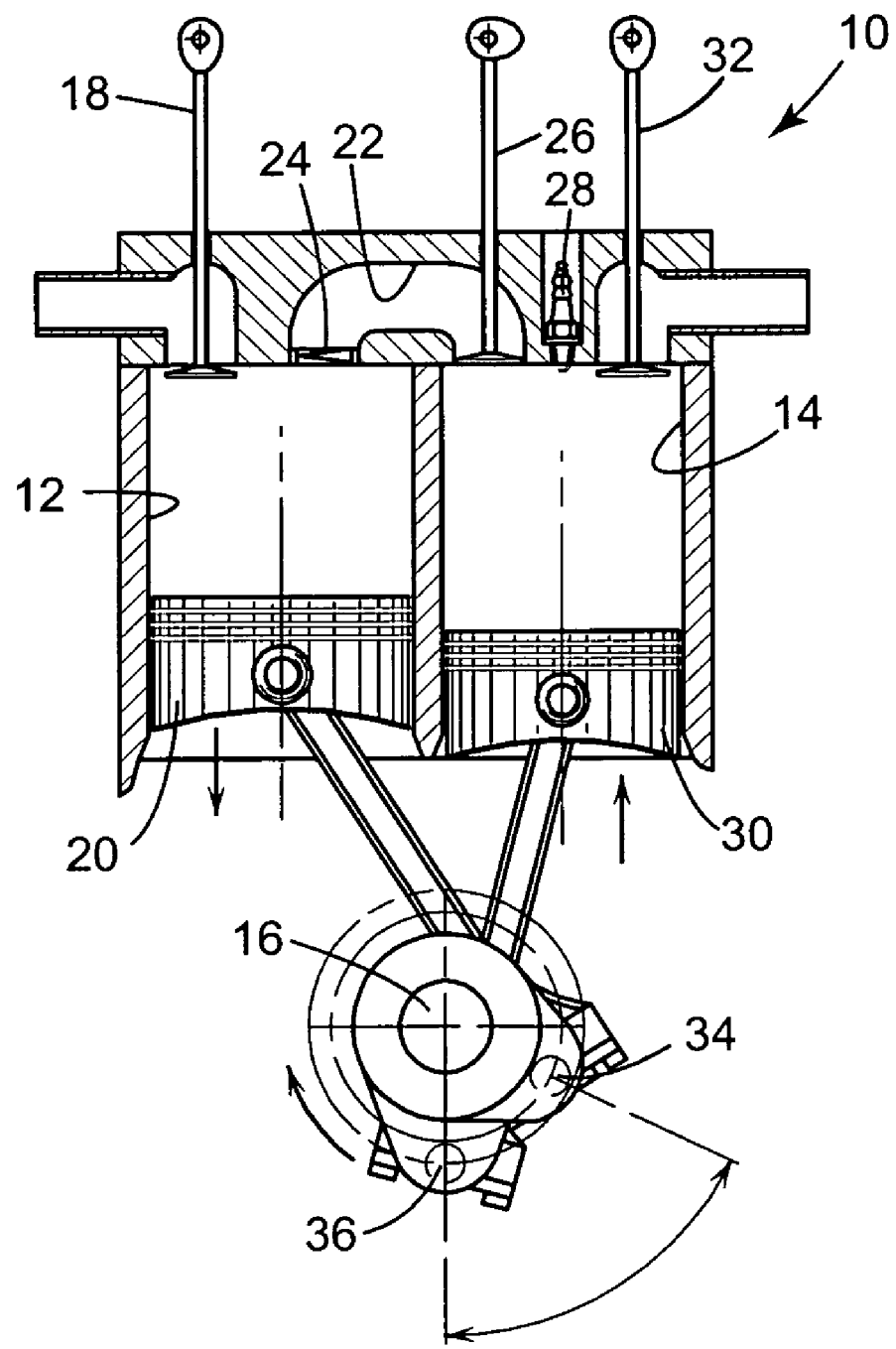
FIG. 1 is a transverse cross-sectional view of a prior art split-cycle engine.
Figure 2:
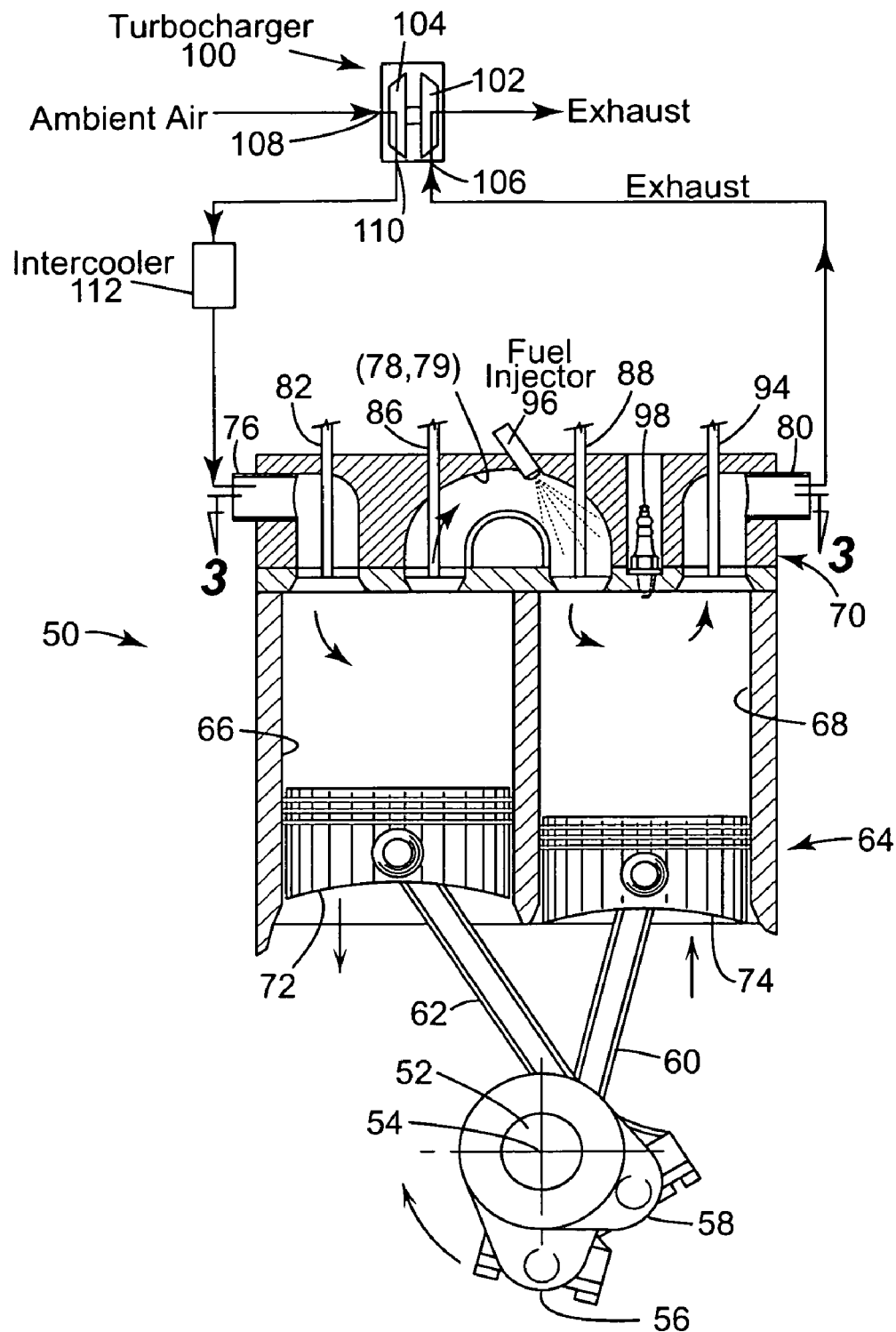
FIG. 2 is a transverse cross-sectional view of an exemplary embodiment of a baseline split-cycle engine in accordance with the present invention.
Figure 3:
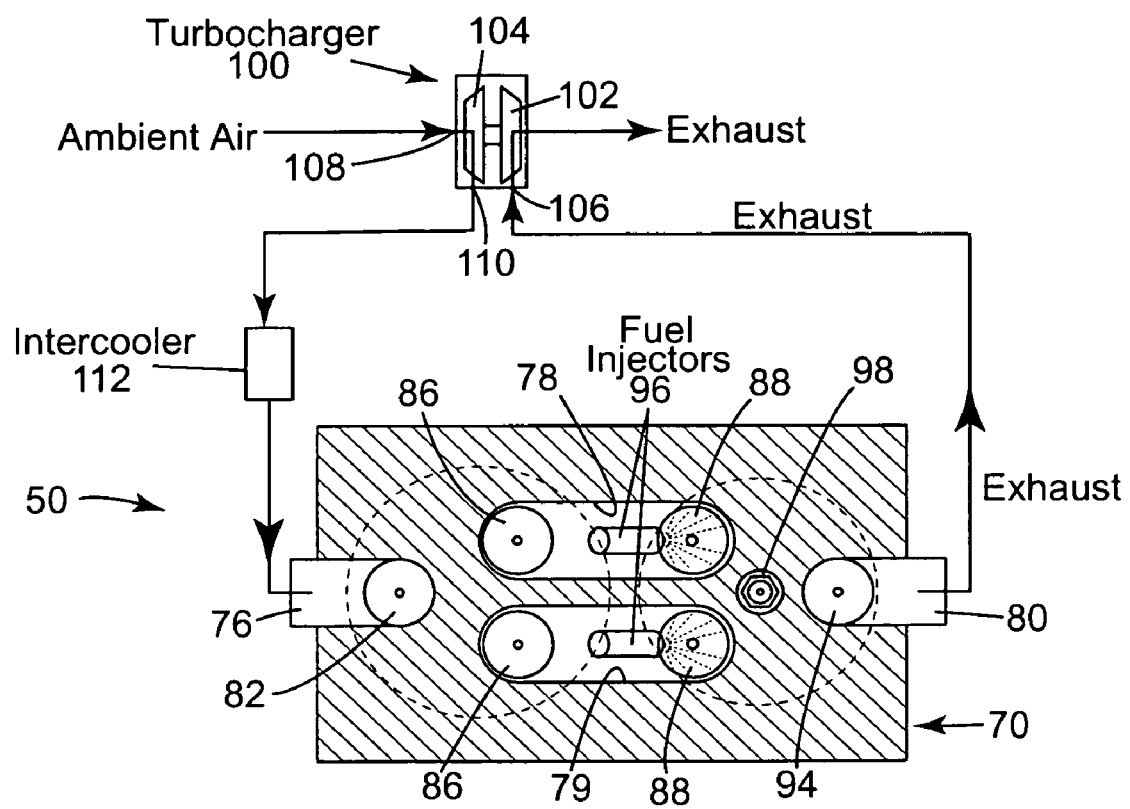
FIG. 3 is a cross-sectional top view of the baseline split-cycle engine taken thru line 3-3 of FIG. 2 with fuel injectors superimposed.

Referring now to FIGS. 2 and 3 of the drawings in detail, numeral 50 generally indicates an exemplary embodiment of a split-cycle engine having knock resistant features in accordance with the present invention. Engine 50 includes a crankshaft 52 rotatable about a crankshaft axis 54 in a clockwise direction as shown in the drawing. The crankshaft 52 includes adjacent angularly displaced leading and following crank throws 56, 58, connected to connecting rods 60, 62, respectively.

Engine 50 further includes a cylinder block 64 defining a pair of adjacent cylinders, in particular a compression cylinder 66 and an expansion cylinder 68 closed by a cylinder head 70 at one end of the cylinders opposite the crankshaft 52.

A compression piston 72 is received in compression cylinder 66 and is connected to the connecting rod 62 for reciprocation of the piston between top dead center (TDC) and bottom dead center (BDC) positions. An expansion piston 74 is received in expansion cylinder 68 and is connected to the connecting rod 60 for similar TDC/BDC reciprocation.

In this embodiment the expansion piston 74 leads the compression piston 72 by 20 degrees crank angle. In other words, the compression piston 72 reaches its TDC position 20 degrees of crankshaft rotation after the expansion piston 74 reaches its TDC position. The diameters of the cylinders and pistons and the strokes of the pistons and their displacements need not be the same.

The cylinder head 70 provides the structure for gas flow into, out of and between the cylinders 66, 68. In the order of gas flow, the cylinder head includes an intake port 76 through which intake air is drawn into the compression cylinder 66, a pair of separate crossover (Xovr) passages (or ports) 78 and 79 through which compressed air is transferred from the compression cylinder 66 to the expansion cylinder 68, and an exhaust port 80 through which spent gases are discharged from the expansion cylinder.

Gas flow into the compression cylinder 66 is controlled by an inwardly opening poppet type intake valve 82. Gas flow into and out of each crossover passage 78 and 79 is controlled by a pair of outwardly opening poppet valves, i.e., crossover compression (XovrC) valves 86 at inlet ends of the Xovr passages 78, 79 and crossover expansion (XovrE) valves 88 at outlet ends of the crossover passages 78, 79. Exhaust gas flow out the exhaust port 80 is controlled by an inwardly opening poppet type exhaust valve 94. These valves 82, 86, 88 and 94 may be actuated in any suitable manner such as by mechanically driven cams, variable valve actuation technology or the like.

Each crossover passage 78, 79 has at least one high pressure fuel injector 96 disposed therein. The fuel injectors 96 are operative to inject fuel into a charge of compressed air within the crossover passages 78, 79 entirely during the compression stroke.

Engine 50 also includes one or more spark plugs 98 or other ignition devices located at appropriate locations in the end of the expansion cylinder wherein a mixed fuel and air charge may be ignited and burned during the expansion stroke.

Additionally, the engine 50 is desirably provided with a boosting device, such as a turbocharger 100, capable of raising cylinder intake charge pressures up to and beyond 1.7 bar, in order to take full advantage of the knock resistant features of the engine as discussed in greater detail herein. Turbocharger 100 includes an exhaust turbine 102 driving a rotary compressor 104. The turbine has an exhaust gas inlet 106 connected to receive pressurized exhaust gas from the exhaust port 80 of the engine 50. The turbine 102 drives a compressor 104, which draws in ambient air through an air inlet 108 and discharges pressurized air through a compressed air outlet 110. The compressed air passes through a single stage intercooler 112 and enters the air intake port 76 at an absolute pressure of at least 1.7 bar at full load.

Knocking in an engine is a function of the amount of time fuel is exposed to excessive temperatures before ignition occurs. Therefore, features that reduce the temperature or time that fuel is exposed to within an engine will increase the engine's resistance to knock.

Three features of the present invention exemplified in split-cycle engine 50 contribute to knock prevention, or higher knock resistance:

1. Very Late Fuel Injection into the Crossover (Xovr) Passages 78 and 79, Compared to a Conventional Engine.

In the split-cycle engine 50, the fuel injection from injectors 96 occurs after the air intake stroke and entirely during the compression stroke. In contrast, in a conventional engine with port fuel injection, fuel injection occurs before and during the air intake stroke and before the compression stroke. Also, in a conventional engine with direct fuel injection into the cylinder, fuel injection usually occurs at least partially during the intake stroke, and can continue into the beginning of the compression stroke.

2. Air-Fuel Mixing Aided by Highly Turbulent Flow through the Valves Connecting the Xovr Passage to the Expansion Cylinder (XovrE Valves 88).

Due to the high initial pressure ratio across the XovrE valves 88, initial flow as valves 88 open is at sonic velocity. The resulting highly turbulent flow is a major aid to air-fuel mixing and thus allows very late fuel injection compared to a conventional engine, which has relatively low air velocities during intake and compression strokes compared to split-cycle engine 50. This results in much less time for the fuel/air reactions to occur that can result in knock.

3. The Heat Loss through Xovr Passage Walls from High Temperature Air in the Xovr Passages 78 and 79 Lowering the Charge Air Temperature.

The compressed air in the crossover (Xovr) passages 78 and 79 of the split-cycle engine 50 loses energy by heat transfer to the passage wall surfaces, as the compression raises the temperature of the air well above passage wall temperatures. Although this energy loss reduces efficiency, it aids in preventing fuel self-detonation ("knock") in the Xovr passages 78 and 79 and expansion cylinder 68 prior to spark ignition, as the heat loss lowers the compressed air temperature.

In a conventional gasoline engine, the level of increased air pressure produced by higher compression ratios, supercharging or turbocharging is limited by the tendency to produce knock at the increased air temperatures. This tendency can be reduced by passing the air through an intercooler, after compression by the supercharger or turbocharger. However, after cylinder compression, the air is still at a very increased temperature, and fuel injection has already occurred. With the split-cycle engine 50, an intercooler can also be used after supercharging or turbocharging, but in addition, the unique feature of the split-cycle engine 50 is that air is cooled again after cylinder compression due to the heat loss in the Xovr passages 78 and 79, and fuel injection occurs during the latter portion of that compression.

In order to more accurately predict the effects and optimize the knock resistant features of the present invention (e.g., late fuel injection, gas passage cooling and highly turbulent flow), a computer study (simulation) was commenced. The computer study utilized a specific baseline model of engine 50 having the valve and cylinder parameters as shown in the following tables I and II:

TABLE I

Baseline Engine 50 Cylinder Parameters

| Parameter | Units | Compression Cylinder 66 | Expansion Cylinder 68 |
| --- | --- | --- | --- |
| Cylinder Bore | Millimeters | 94.4 | 86.3 |
| Cylinder Stroke | Millimeters | 87.0 | 120.0 |
| Total Cylinder Displacement | Liter | 0.609 | 0.702 |
| Volumetric Compression Ratio | X:1 | 86 | 121 |

TABLE II

Baseline Engine 50 Valve Parameters

| Parameter | Units | Intake Valve 82 | XovrC Valve 86 | XovrE Valve 88 | Exhaust Valve 94 |
| --- | --- | --- | --- | --- | --- |
| Inner Seat Diameter | Millimeters | 32.0 | 18.0 | 18.0 | 26.0 |
| Maximum Lift | Millimeters | 9.73 | 2.60 | 2.43 | 9.28 |
| Opening Angular Position | Degrees ATDC of Expansion Piston | 62.0 | −15.0 | −5.0 | 155.0 |
| Closing Angular Position | Degrees ATDC of Expansion Piston | 212.0 | 20.5 | 25.0 | −24.0 |

Also, in the computer model, the expansion piston 74 of the baseline engine 50 was set to lead the compression piston 72 by twenty (20) degrees of crank angle rotation. In other words, the compression piston 72 started its compression stroke (i.e., reached its BDC position) at −160 degrees CA before TDC of the expansion piston 74 and the compression piston 72 ended its compression stroke (reached its TDC position) at 20 degrees CA after TDC of the expansion piston 74.

The results of the computer study are disclosed in the following specification and corresponding FIGS. 4-13. Unless otherwise specified, all unreferenced parameters of the baseline engine 50 remain as listed in Tables I and II above. All crank angle positions for any parameter are designated relative to the TDC position of the expansion piston 74 as being 0 degrees CA TDC.

Figure 4:
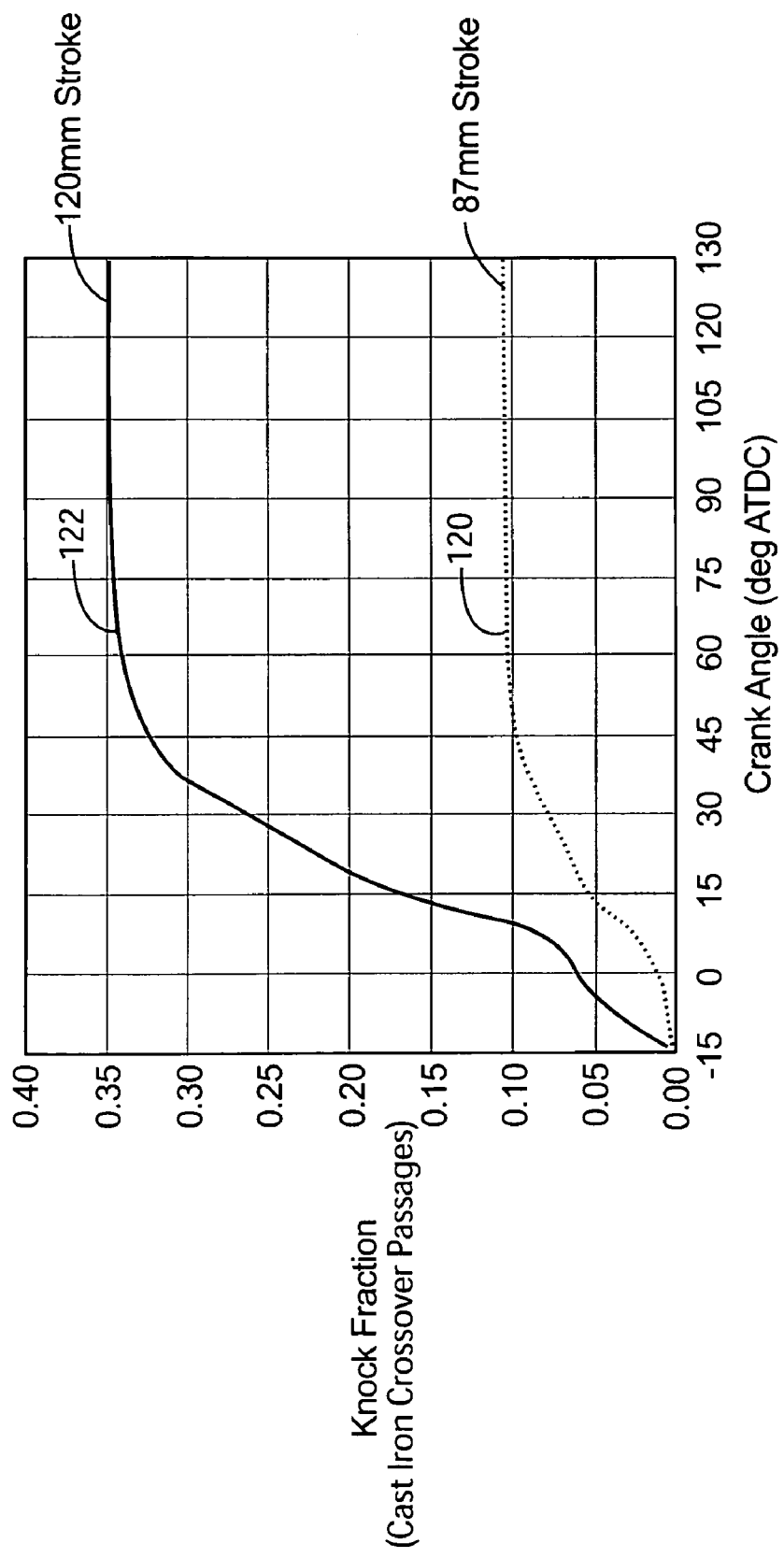
FIG. 4 is a graph of predicted knock fraction vs. crank angle for uninsulated cast iron crossover passages (ports) of various split-cycle engines.

FIG. 4 shows the above referenced computer study's predicted knock fraction vs. crank angle (lines 120 and 122) for two naturally aspirated split-cycle engines having uninsulated cast iron crossover passages (ports). When the knock fraction approaches 1, knock is likely.

Each engine of the study in FIG. 4 was run at 4000 RPM, at 100% engine load, on 100 octane (ON) gasoline, and with a slightly rich air to fuel ratio of 13.05/1 (i.e., 90 percent of the stoichiometric ratio of 14.5/1). Line 120 represents the baseline engine 50 with an 87 mm compression stroke, and line 122 represents a split-cycle engine which differs from the baseline engine 50 only in that it has an elongated compression stroke of 120 mm and has a proportionally larger compression cylinder displacement.

As illustrated in FIG. 4, the knock fraction builds from the start of fuel injection (SOI), which occurs at 15 deg CA before TDC of the expansion piston 74. As the compression cylinder stroke and displacement is increased from 87 to 120 mm (lines 120 and 122 respectively), the final knock fraction increases, but stays below 0.35 at the highest displacement (line 122).

Note that in FIG. 4 the engines modeled represent uninsulated, standard cast iron, Xovr passage walls having dual separate crossover passages 78 and 79, wherein each crossover passage has an average diameter of approximately 13.5 millimeters. Cooling the compressed air in the gas passages 78 and 79 is an important feature in keeping the knock fraction substantially below 1. The type of materials used to construct the passages 78 and 79, the number of passages for a given charge of compressed air, how the passages are insulated, and whether they are actively cooled, are all factors involved in removing heat from the gas passages and therefore reducing the knock fraction.

In the particular cases illustrated by lines 120 and 122 in FIG. 4, a pair of uninsulated, cast iron crossover passages 78 and 79 having associated crossover compression 86 and expansion 88 valves were utilized to remove the heat. The pair of crossover passages 78 and 79 were sized and constructed to conduct away a controlled amount of heat energy contained in compressed gas in the crossover passages between closing of the associated crossover expansion valves 88 during an expansion stroke of the expansion piston 74 and opening of the associated crossover compression valves 86 during a following compression stroke of the compression piston 72. As will be discussed in greater detail herein, it is preferred that at least 5.3 percent, and more preferable that at least 13 percent, of the heat energy contained in the compressed gas is conducted away between the closing of the crossover expansion valves 88 and subsequent opening of the crossover compression valves 86. One skilled in the art would recognize that other combinations and configurations of crossover passages may also be used to remove an equivalent controlled amount of heat energy. For example, more than two gas passages may be used to increase the exposed gas passage internal wall surface area for a given charge of compressed air, or a gas passage may be actively cooled.

In this study, start of fuel injection (SOI) for the baseline engine 50 is being modeled after the beginning of the compression stroke and very close to XovrE valve 88 opening. A preferable SOI range is between 25 degrees CA before TDC to TDC.

Also in this study, end of fuel injection (EOI) is modeled before the end of the compression stroke and before the close of the XovrE valve 88. A preferable EOI range is between −10 to +10 degrees CA after TDC.

Timing the fuel injection from the fuel injectors 96 into the crossover passages 78 and 79 to occur entirely during the compression stroke of the compression piston 72, and within the preferred ranges of SOI and EOI, results in nearly complete transfer of injected fuel from the Xovr passages 78, 79 into the expansion cylinder 68. Note that timing the SOI to occur before the start of the compression stroke may result in premature knocking. Note also that timing the EOI to occur after the end of the compression stroke may result in a significant amount of fuel being trapped in the crossover passages 78 and 79 and not being transferred into the expansion cylinder 68.

The fuel injection pressure must necessarily be higher than the Xovr passage 78 and 79 pressure, with different injection pressures utilized to obtain optimal injection duration, depending on the engine speed and load operation point, and different injection system capabilities.

Figure 5:
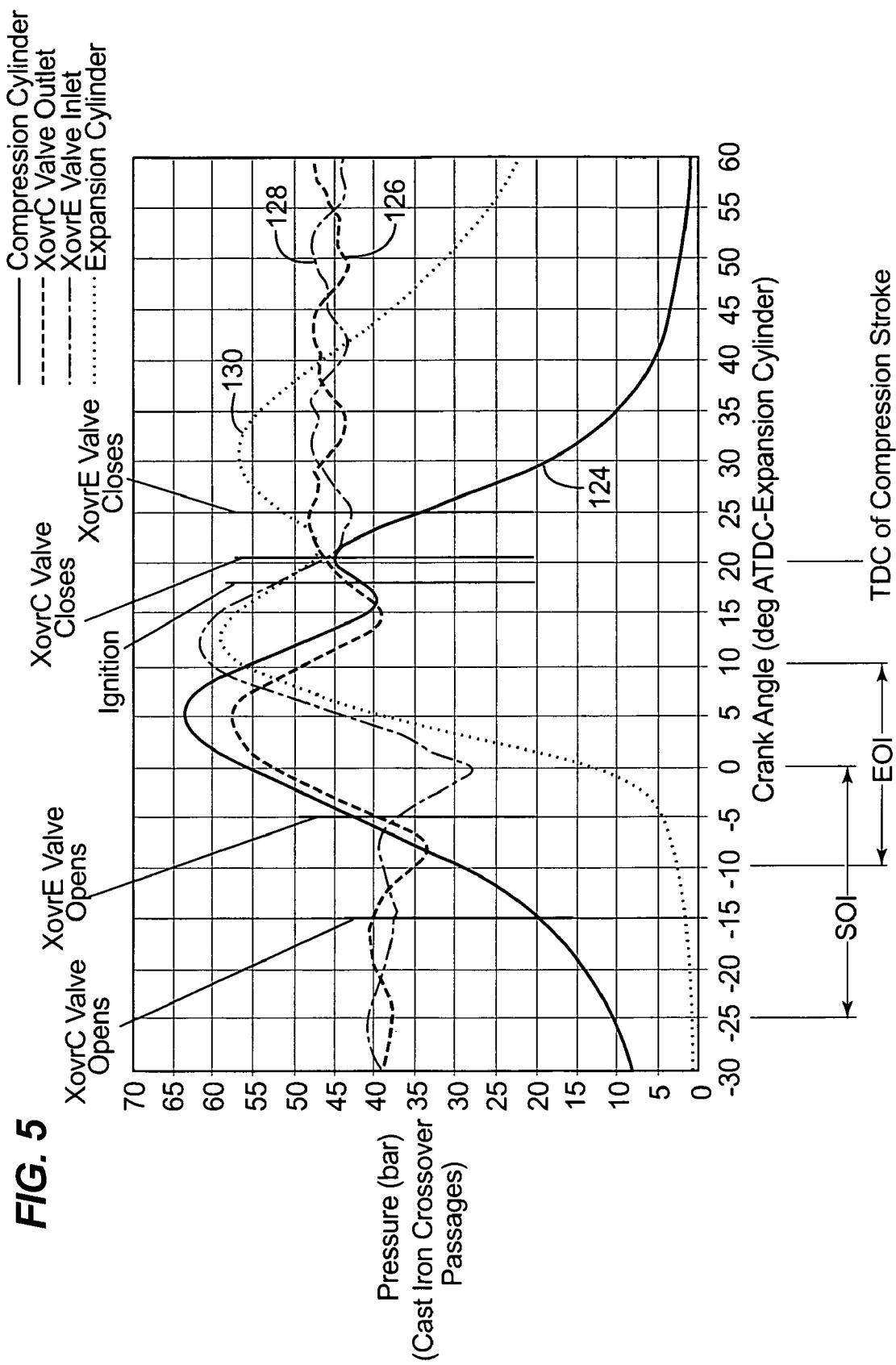
FIG. 5 is a graph of cylinder and crossover passage pressures for uninsulated cast iron crossover passages of the baseline split-cycle engine.

FIG. 5 shows predicted Xovr passage 78 and 79, compression 66 and expansion 68 cylinder pressures vs. crank angle from a naturally aspirated baseline split-cycle engine 50 cycle simulation at 4000 RPM, 100% (full) engine load. Timings are shown for the XovrC valve 86, XovrE valves 88, compression cylinder 66 expansion cylinder 68, spark plug 98 ignition, SOI range for injectors 96, EOI range for injectors 96 and end of compression stroke. Line 124 represents compression cylinder 66 pressure. Line 126 represents XovrC valve 86 outlet pressure, i.e., the pressure taken at a point in the crossover passages 78, 79 located right next to the XovrC valve 86 poppet head. Line 128 represents XovrE valve 88 inlet pressure, i.e., the pressure at a point taken in the crossover passages 78, 79 located right next to the XovrE valve poppet head. Finally, line 130 represents expansion cylinder 68 pressure.

For this FIG. 5 simulation, SOI timing was modeled as 20 degrees BTDC, with EOI timing at 1 degree ATDC. This EOI is only about 16 degrees ahead of spark ignition. Note that in this range Xovr passage pressures (lines 126 and 128) range from about 25-65 bar, and thus fuel injection pressure must be well above these pressures. Note also that as the XovrE valve 88 opens, the XovrE valve inlet pressure is significantly higher (40 bar) than the expansion cylinder 68 pressure (5 bar), with a high enough pressure ratio across the XovrE valves 88 to cause sonic flow of the fuel-air mixture through the XovrE valve open areas, which increases turbulence and fuel-air mixing.

Figure 6:
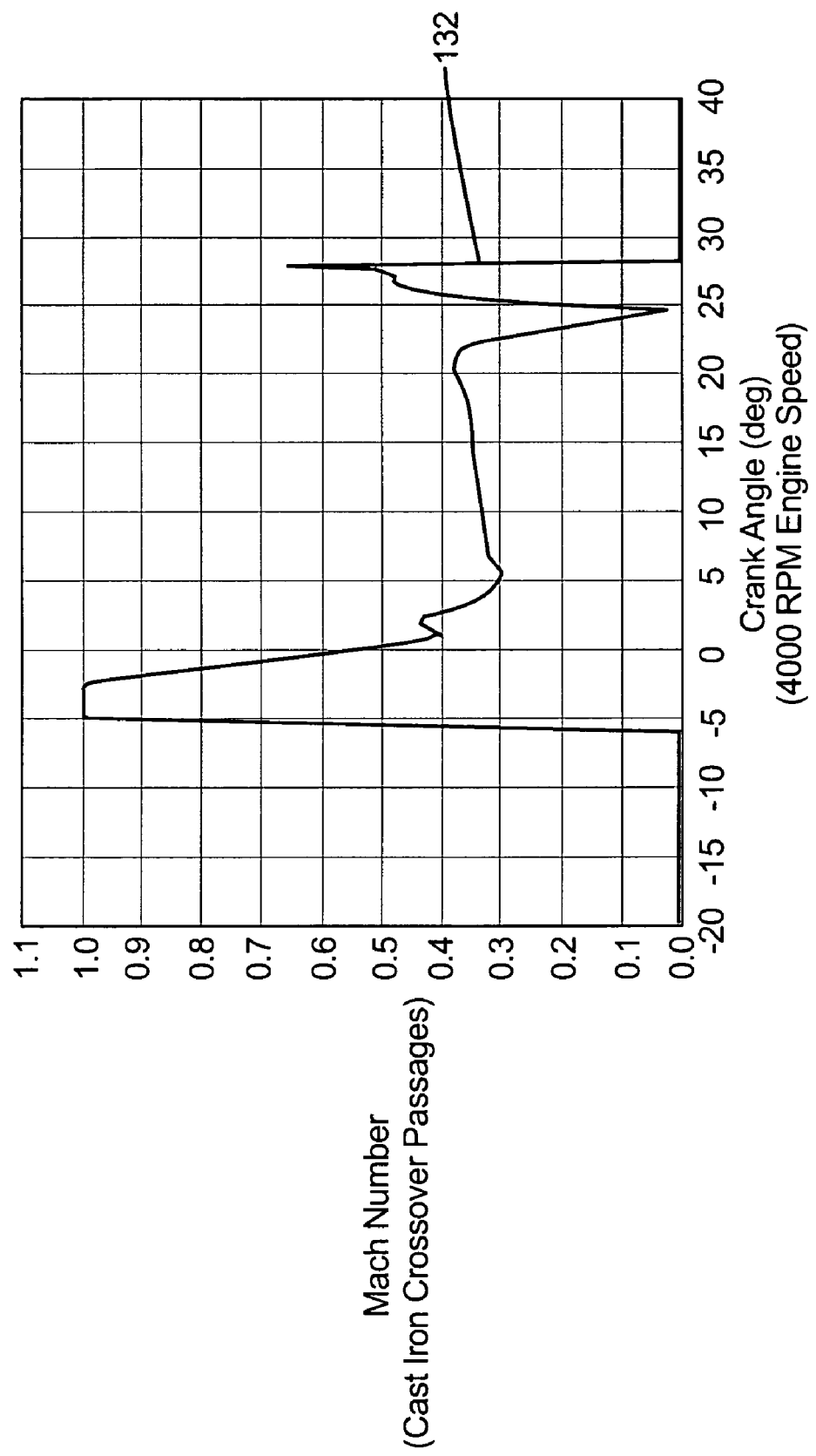
FIG. 6 is a graph of XovrE valve flow in Mach number vs. crank angle with uninsulated cast iron crossover passages at 4000 rpm of the baseline split-cycle engine.
Figure 7:
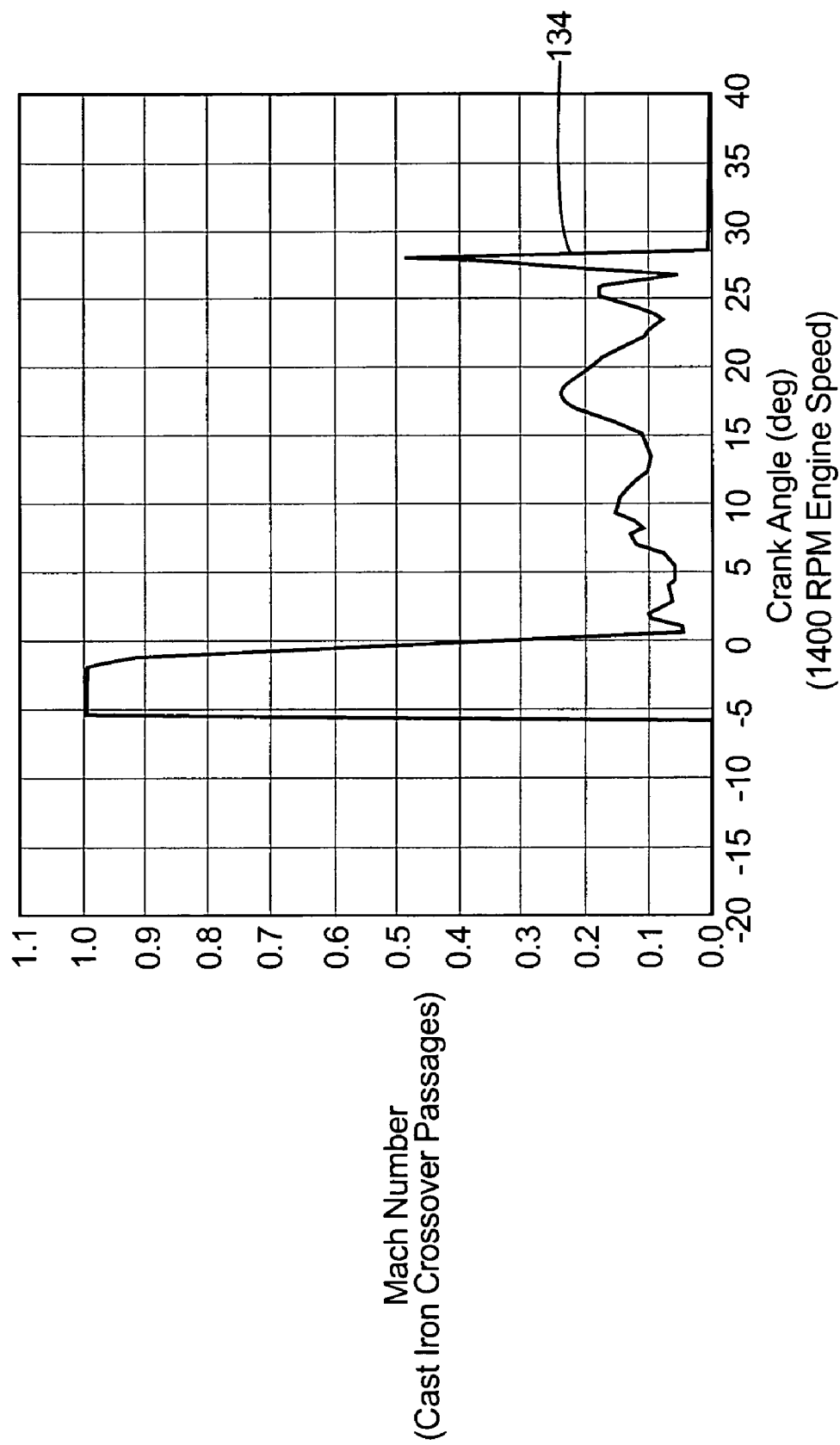
FIG. 7 is a graph of XovrE valve flow in Mach number vs. crank angle with uninsulated cast iron crossover passages at 1400 rpm of the baseline split-cycle engine.

FIGS. 6 and 7 show the Mach number of the approximate flow through the XovrE valves 88 from the crossover passages 78 and 79 into the expansion cylinder 68 at 4000 rpm (line 132 of FIG. 6) and 1400 rpm (line 134 of FIG. 7) respectively, when the baseline engine 50 is run at full (100%) engine load. As the XovrE valves 88 first open, the flow is sonic (Mach=1.0) for about 3~4 degrees at both speeds, then drops to about Mach 0.35 at 4000 rpm and Mach 0.15 at 1400 rpm, which is still considered to be high velocity turbulent flow. The high velocity turbulent flow contributes to the knock resistance of the engine 50 by reducing the amount of time that a fuel/air charge is exposed to high temperatures of compression, since the turbulence provides rapid air-fuel mixing.

By comparing FIGS. 5, 6 and 7, it can be seen that the preferred SOI range of engine 50 is between −25 to 0 degrees CA after TDC, while initial sonic flow occurs between about −5 to −2 degrees CA after TDC. This means that it is possible for the entire fuel injection event to occur after the flow of air has dropped below sonic velocity. However, it is preferable that at least a portion of the injected fuel be made to pass through the crossover expansion valve 88 during the initial sonic flow of compressed gas in order to more thoroughly mix the fuel and air together.

Referring back to FIG. 5, note that after the XovrE valves 88 close at 25 degrees ATDC, the average pressure (lines 126 and 128) in the Xovr passages 78, 79 is about 47 bar. However, that average pressure (lines 126 and 128) in the trapped volume of the Xovr passages 78, 79 decreases to about 39 bar by the time the XovrC valves 86 open at 15 degrees BTDC. This energy loss is due to the heat transfer from the trapped air to the Xovr passage walls, and represents about a 13% loss of the energy expended to compress the air. Since this energy loss is an important contributor to the low knock numbers predicted in FIG. 4, it is desirable to construct the gas passages 78 and 79 such that at least 13% of the energy in the trapped volume of air in the gas passages 78 and 79 is removed between closing of the XovrE valves 88 and subsequent opening of the XovrC valves 86.

Figure 8:
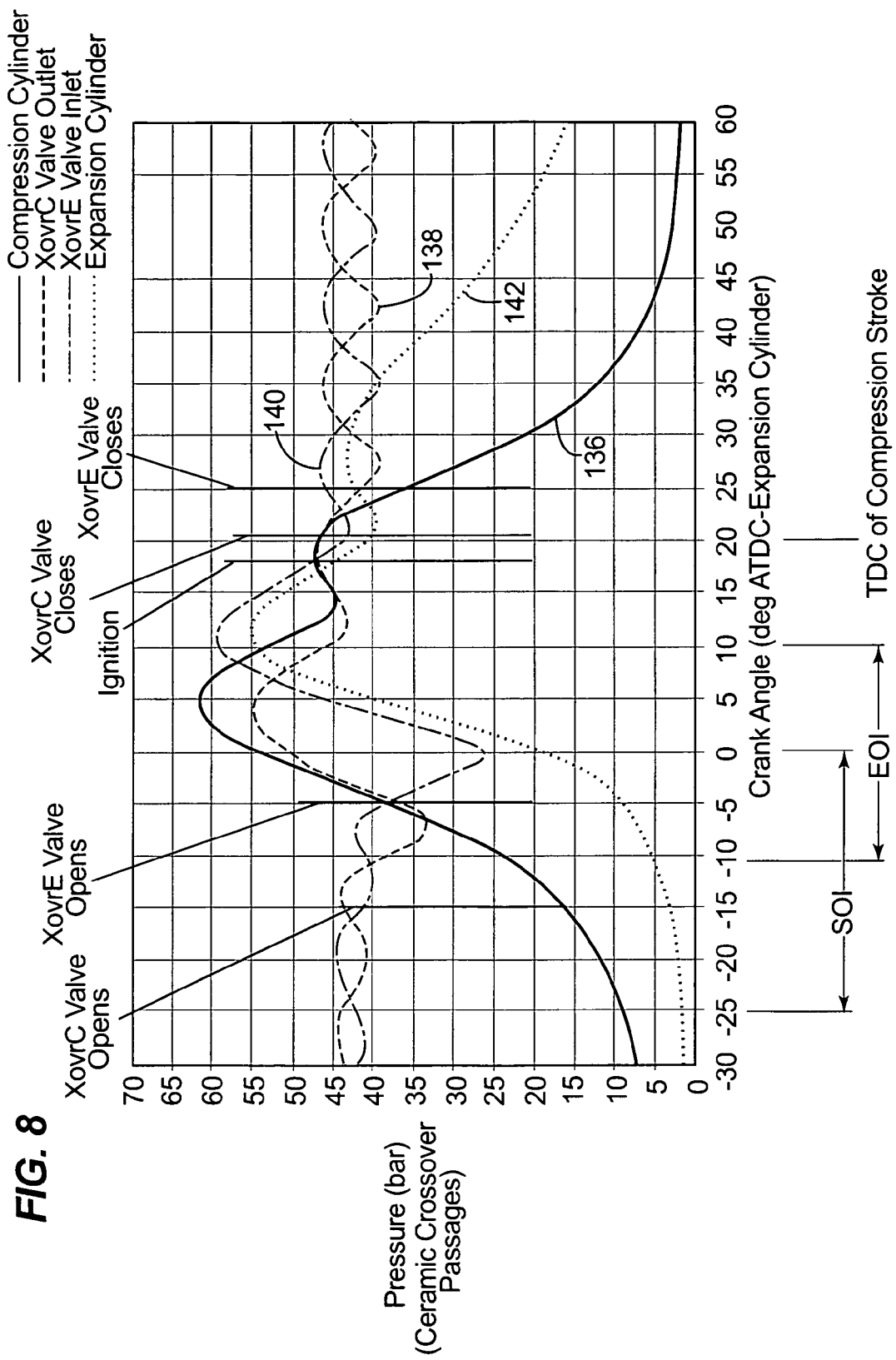
FIG. 8 is a graph of cylinder and crossover passage pressures for ceramic walled crossover passages of the baseline split-cycle engine.

Referring to FIG. 8, to determine the effects of the heat loss, simulations were run with highly insulated gas passage 78 and 79 walls, with a ceramic inner layer and air gaps around the passages. The baseline engine 50 modeled in FIG. 8 is identical to the engine modeled in FIG. 5, but with the ceramic insulated passage walls. Line 136 represents compression cylinder 66 pressure. Line 138 represents XovrC valve 86 outlet pressure, i.e., the pressure taken at a point in the crossover passages 78, 79 located right next to the XovrC valve 86 poppet head. Line 140 represents XovrE valve 88 inlet pressure, i.e., the pressure at a point taken in the crossover passages 78, 79 located right next to the XovrE valve poppet head. Finally, line 142 represents expander cylinder 68 pressure.

FIG. 8 shows predicted Xovr passage pressures (lines 138 and 140) vs. crank angle with very little loss from between when the XovrE valves 88 close at 25 degrees ATDC to when the XovrC valves 86 subsequently open at 15 degrees BTDC. Note that all pressures (and therefore temperatures) in both cylinders 66 and 68 and the crossover passages 78 and 79 of the baseline engine 50 modeled in FIG. 8 with the ceramic insulated gas passages 78 and 79 are higher relative to the baseline engine 50 modeled in FIG. 5 with the uninsulated crossover passages 78 and 79.

Figure 9:
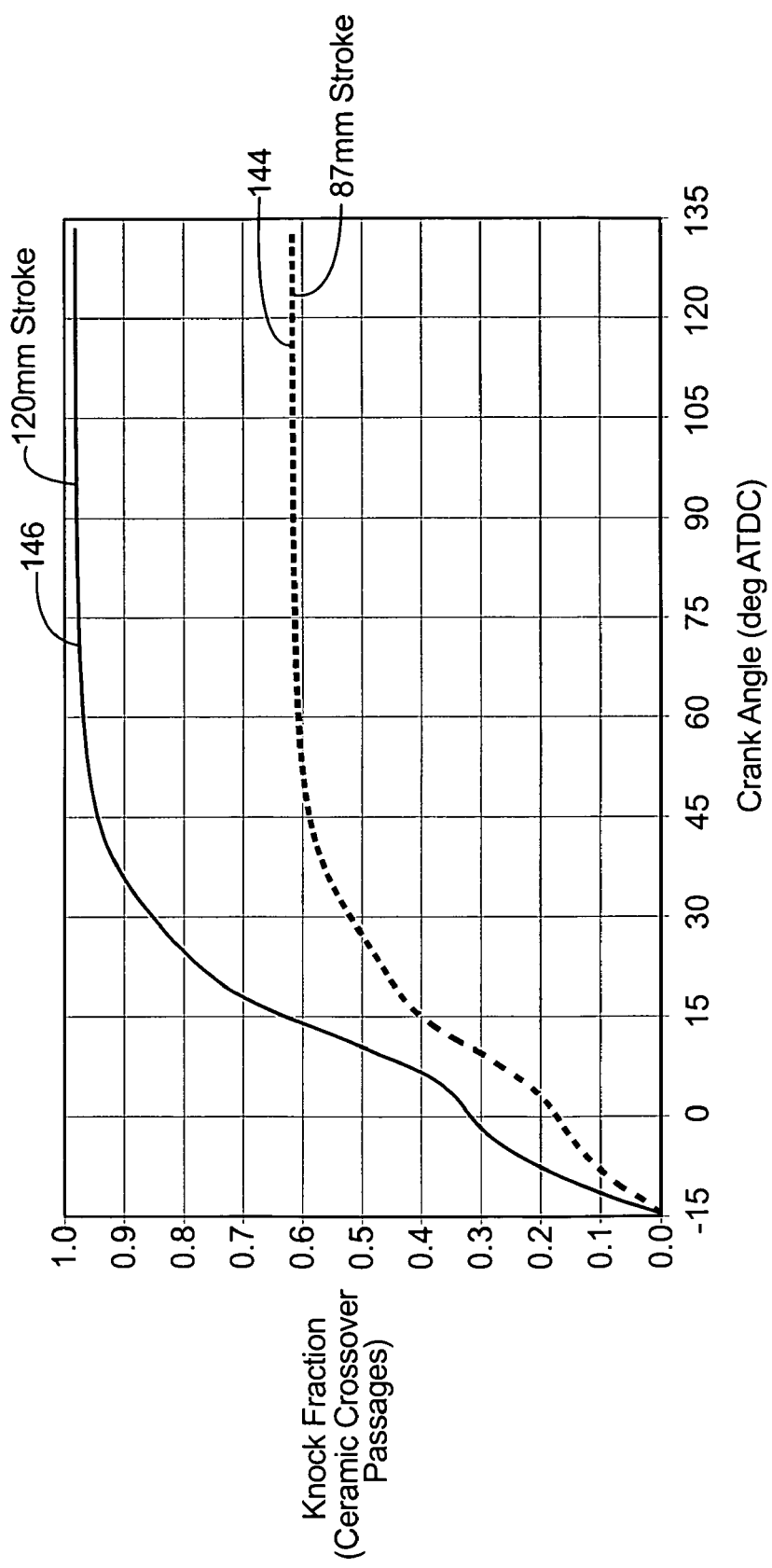
FIG. 9 is a graph of predicted knock fraction vs. crank angle for ceramic walled crossover passages of various split-cycle engines.

Referring to FIG. 9, with the increased crossover passage pressures and temperatures, the computer study simulations predicted a knock fraction unacceptably reaching 1.0 (and therefore knocking) for higher compression/expansion cylinder displacement ratios. Accordingly, the simulations had to be re-run with the air to fuel ratio changed from 13.05/1 (90 percent of the stoichiometric ratio) to a richer 10.4/1 (70 percent of the stoichiometric ratio), in order to promote evaporative cooling and keep the predicted knock fraction below 1.0. FIG. 9 shows the resulting knock fractions with 100 ON fuel, wherein line 144 represents the baseline engine 50 with an 87 mm compression stroke, and line 146 represents a split-cycle engine which differs from the baseline engine 50 only in that it has an elongated compression stroke of 120 mm and has a proportionally larger displacement.

Note that the higher knock fractions are above 0.9 (line 146), which would not be feasible in production due to insufficient knock margin for variations in operating conditions and ambient temperatures and pressures. However, the knock fractions with totally non-insulated passages leave a lot of knock margin (see FIG. 4), even at high compression/expansion cylinder displacement ratios. Thus a moderate amount of insulation, such as with a stainless steel sleeve and surrounding air gap for passage sections, could provide an increase in efficiencies while still keeping the knock fractions substantially below 1.0.

Figure 10:
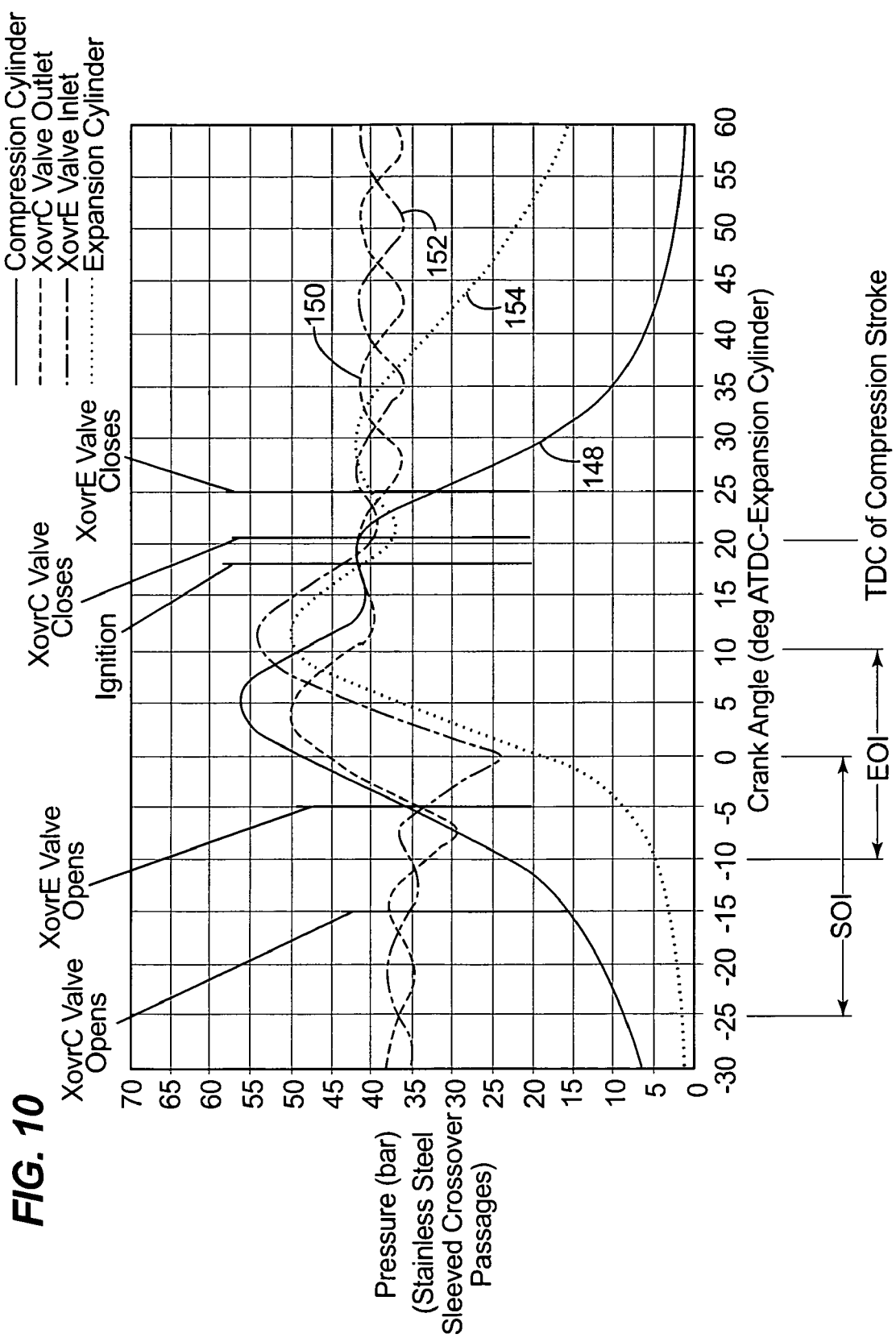
FIG. 10 is a graph of cylinder and crossover passage pressures for stainless steel sleeved crossover passages of the baseline split-cycle engine.

FIG. 10 is similar to FIGS. 5 and 8, but with the gas passages 78 and 79 walls converted to a stainless steel sleeve inside the center sections of the passages, with a 5 mm air gap between the sleeve and the cast iron cylinder head 70 of baseline engine 50. The ends of the gas passages 78 and 79, which includes bends to accommodate the XovrC 86 and XovrE 88 valves, are kept as uninsulated cast iron. Line 148 represents compression cylinder 66 pressure. Line 150 represents XovrC valve 86 outlet pressure, i.e., the pressure taken at a point in the crossover passages 78, 79 located right next to the XovrC valve 86 poppet head. Line 152 represents XovrE valve 88 inlet pressure, i.e., the pressure at a point taken in the crossover passages 78, 79 located right next to the XovrE valve poppet head. Finally, line 154 represents expansion cylinder 68 pressure.

FIG. 10 shows predicted Xovr passages 78 and 79, compression 66 and expansion 68 cylinder pressures vs. crank angle with some loss from XovrE valve 88 close to XovrC valve 86 open, but not as much as with the uninsulated (cast iron) walls of FIG. 5. The average passage pressure drops from about 47.5 bar at XovrE valve 88 closing to 45 bar at XovrC valve 86 opening, representing about a 5.3% loss of the energy expended to compress the air, as compared to the 13% for the uninsulated passages.

Figure 11:
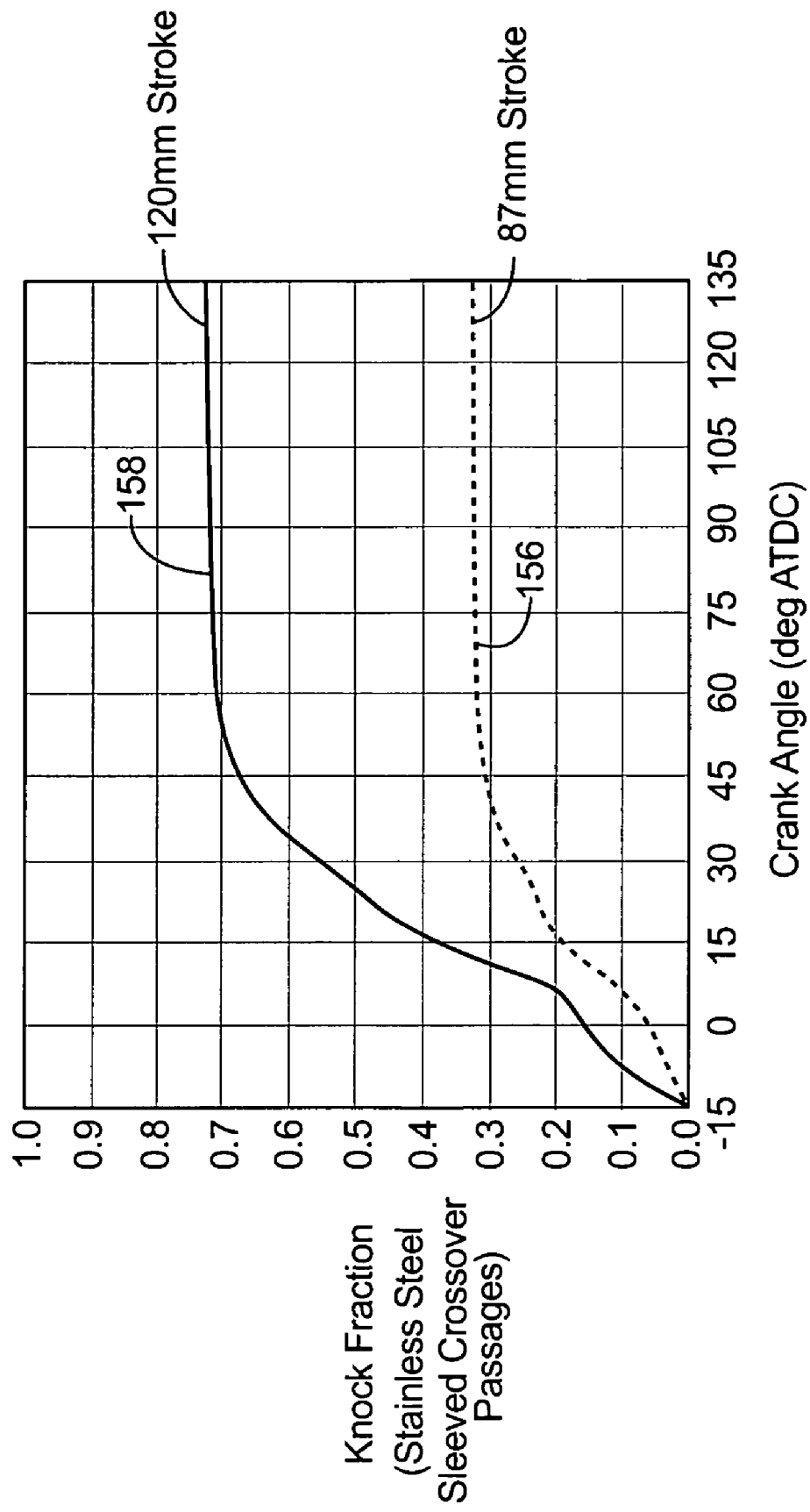
FIG. 11 is a graph of predicted knock fraction vs. crank angle for stainless steel sleeved crossover passages of various split-cycle engines.

FIG. 11 shows the predicted knock fractions for two split-cycle engines wherein crossover passages 78 and 79 are insulated with the stainless steel sleeves and air gaps. Line 156 represents the baseline engine 50 with an 87 mm compression stroke, and line 158 represents a split-cycle engine which differs from the baseline engine 50 only in that it has an elongated compression stroke of 120 mm. Both engines in this simulation are run on 100 ON fuel. The knock fractions are much higher than for the uninsulated passages of FIG. 4, but have significant margin below 1.0 compared to the ceramic-walled passages of FIG. 9.

Figure 12:
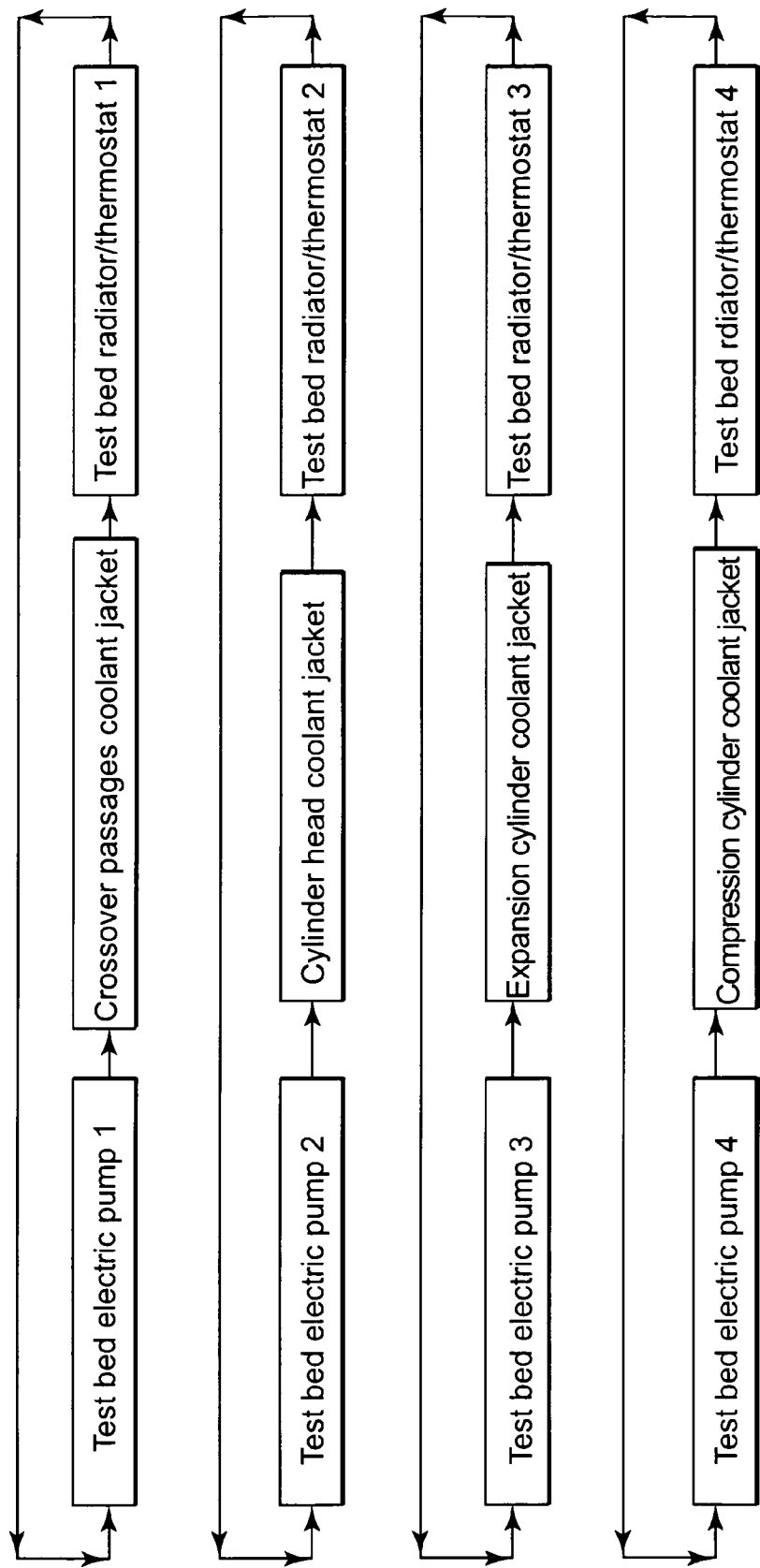
FIG. 12 is a schematic diagram of four separately controlled active coolant jackets for the baseline split-cycle engine.

Referring to FIG. 12, the above results show that the predicted knock fraction of the split-cycle engine 50 is quite sensitive to the degree of energy loss in the Xovr passages 78 and 79. This raises the possibility of dynamically controlling this heat loss with some form of 'active' cooling system, and thereby influencing the engine's knock tendency under different operating conditions. FIG. 12 shows a schematic of an exemplary cooling system for the split-cycle engine 50, showing separate cooling circuits for different parts of the engine 50, including the Xovr passages 78 and 79.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A split-cycle engine comprising:
    a crankshaft rotatable about a crankshaft axis of the engine;
    a compression piston slidably received within a compression cylinder and operatively connected to the crankshaft such that the compression piston reciprocates through an intake stroke and a compression stroke during a single rotation of the crankshaft;
    an expansion piston slidably received within an expansion cylinder and operatively connected to the crankshaft such that the expansion piston reciprocates through an expansion stroke and an exhaust stroke during a single rotation of the crankshaft;
    a crossover passage interconnecting the compression and expansion cylinders, the crossover passage including a crossover compression (XovrC) valve and a crossover expansion (XovrE) valve defining a pressure chamber therebetween;
    a fuel injector disposed in the pressure chamber of the crossover passage; and
    a control means operatively coupled to the fuel injector, the control means configured to execute fuel injection entirely during the compression stroke of the compression piston.

2. The engine of claim 1 wherein the start of fuel injection into the crossover passage occurs within the range of from 25 to 0 crank angle degrees before top dead center of the expansion piston.

3. The engine of claim 2 wherein the end of fuel injection into the crossover passage occurs within the range of from 10 crank angle degrees before to 10 crank angle degrees after top dead center of the expansion piston.

4. The engine of claim 1 wherein the end of fuel injection into the crossover passage occurs within the range of from 10 crank angle degrees before to 10 crank angle degrees after top dead center of the expansion piston.

5. The engine of claim 1 wherein the crossover passage is constructed to conduct away at least 5.3 percent of the heat energy contained in compressed gas retained in the crossover passage between closing of the crossover expansion valve during an expansion stroke of the expansion piston and opening of the crossover compression valve during a following compression stroke of the compression piston.

6. The engine of claim 1 wherein the crossover passage is constructed to conduct away at least 13 percent of the heat energy contained in compressed gas retained in the crossover passage between closing of the crossover expansion valve during an expansion stroke of the expansion piston and opening of the crossover compression valve during a following compression stroke of the compression piston.

7. The engine of claim 1 wherein the crossover passage is actively cooled to conduct away a controlled amount of the heat energy contained in compressed gas in the crossover passage between closing of the crossover expansion valve during an expansion stroke of the expansion piston and opening of the crossover compression valve during a following compression stroke of the compression piston.

8. The engine of claim 1 wherein, during operation at full load between 1400 RPM and 4000 RPM of the crankshaft, the pressure ratio across the crossover expansion valve equals or exceeds the critical value causing initial sonic flow of compressed gas from the crossover passage to the expansion cylinder upon opening of the crossover expansion valve.

9. The engine of claim 8 wherein at least a portion of the injected fuel delivered to the expansion cylinder each cycle is passed through the crossover expansion valve during the initial sonic flow of compressed gas through the crossover expansion valve.

10. The engine of claim 1 wherein the crossover passage comprises at least a pair of separate crossover passages having associated crossover compression and crossover expansion valves, the at least a pair of crossover passages sized to conduct away at least 5.3 percent of heat energy contained in compressed gas in the crossover passages between closing of the associated crossover expansion valves during an expansion stroke of the expansion piston and opening of the associated crossover compression valves during a following compression stroke of the compression piston.

* * * * *